June 10, 1958 R. E. FIDLER 2,838,330
SELF-RIGHTING BALL JOINT ASSEMBLY
Filed Dec. 15, 1954
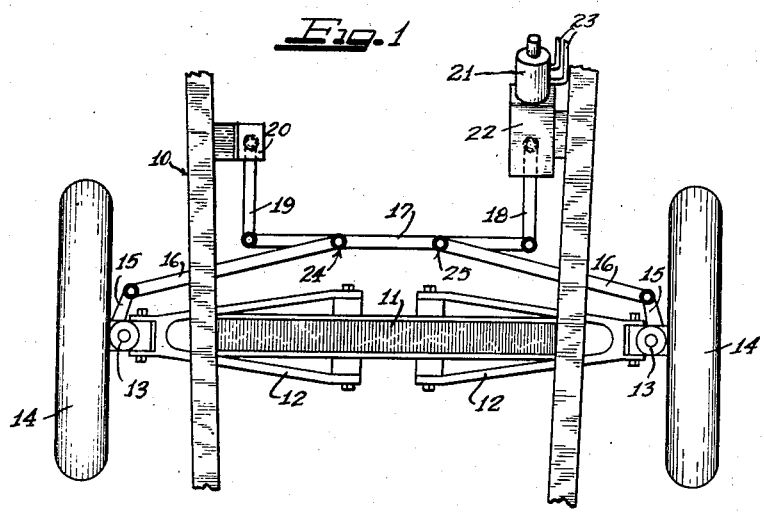
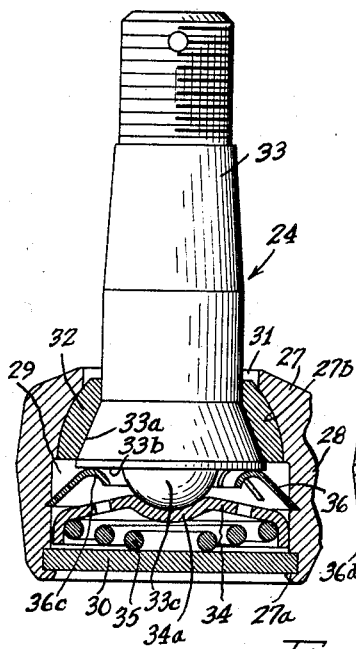
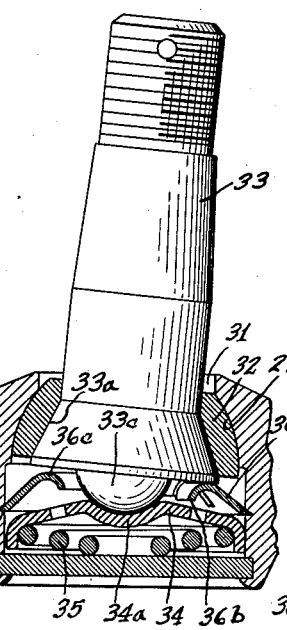
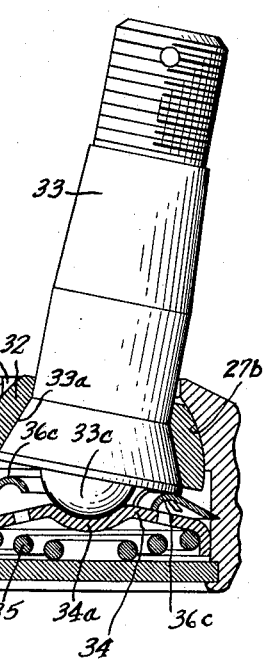
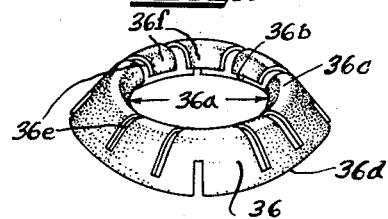
Inventor
ROBERT E. FIDLER
by Hill, Sherman, Meroni, Gross & Simpson Attys.

United States Patent Office 2,838,330
Patented June 10, 1958

2,838,330

SELF-RIGHTING BALL JOINT ASSEMBLY

Robert E. Fidler, Rochester, Mich., assignor to Thompson Products, Inc., Cleveland, Ohio, a corporation of Ohio Application December 15, 1954, Serial No. 475,403

2 Claims. (Cl. 287—90)

The present invention relates to a universal joint assembly of the type utilized in tie rod linkages for automotive vehicle steering control units. In particular, it relates to tie rod connections including ball joint structures where such structures are used in connection with a power steering booster mechanism in the automobile.

A common type of steering linkage employs a pair of steering arms which control movement of the wheels, the steering arms being connected to a steering linkage comprising a pair of tie rods connected by means of a cross link which in turn is connected at opposite ends to an idler arm and a pitman arm operated by movement of the steering column. In a power assisted driving system, a power booster can be coupled to the pitman arm or to the idler arm to actuate the arm and operate the steering linkage.

Such power assisted steering linkage may put an excessive strain upon the joint assemblies employed in the steering linkage proper. Since these joints must accommodate both rotation and tilting, they usually are of the ball joint type in which rotation of the ball stud accommodates steering motion while tilting accommodates rise and fall of the spring wheels. To exactly transmit steering action, the ball studs should not tilt unless the wheels rise and fall. When, however, such linkages are subjected to excessive strains such as might occur when the steering column is operated while the automobile is parked, or where a wheel is jammed in a rut or against a curb there may be a tendency for the stud to be forced out of its upright or vertical relation with the socket, resulting in an improper orientation of the wheels with respect to the steering linkage.

To overcome this difficulty, the present invention now provides self-righting joint constructions particularly applicable to tie rod assemblies, the joint being designed to oppose tilting of the ball stud with respect to its socket, and to right the stud into a substantially vertical position when the high steering thrust has been removed.

In view of the foregoing, an object of the present invention is to provide an improved joint structure of the ball joint type with a means for resisting vertical misalignment of the stud, and means for restoring the stud to its proper orientation with respect to its socket.

Another object of the invention is to provide an improved joint structure particularly applicable to tie rod constructions employed in power assisted steering linkages.

Another object of the invention is to provide a ball joint assembly and a tie rod assembly with means for correcting temporary misalignments in such assemblies.

Other objects and features of the present invention will become apparent to those skilled in the art from the following description of the attached drawings in which a preferred embodiment of the present invention has been shown by way of illustration.

In the drawings:

Figure 1 is a diagrammatic plan view of a steering linkage which might be employed in the present invention;

Figure 2 is a fragmentary cross-sectional view of the joint assembly employed in the steering linkage of Figure 1, illustrating the condition of the elements in their normal upright positions;

Figure 3 is a view similar to Figure 2, but illustrating the stud displaced slightly from its normal position;

Figure 4 is a view similar to Figures 2 and 3 but illustrating the stud in its fully tilted position; and Figure 5 is a view in perspective of the spring element employed in the joint assembly illustrated in the other figures.

As shown in the drawings:

The steering linkage illustrated more or less diagrammatically in Figure 1 includes an automobile frame 10 supporting a cross brace or frame member 11 from which are independently sprung a pair of dirigible wheels. A pair of wheel support arms 12 are pivotally supported on the member 11 and at their outer ends they carry conventional wheel spindle assemblies 13. Wheels 14 are pivotally connected to the spindle assemblies 13 for steering movement in response to actuation of the steering linkage. The steering actuation of the wheels 14 is provided through a pair of steering arms 15 on the spindles 13 whose position is controlled by a conventional steering linkage comprising a pair of tie rods 16 connected to a cross link 17, one end of the link being connected to a pitman arm 18.

In the particular assembly shown, the steering linkage includes an idler arm 19 pivoted to a bracket 20 on the frame 10 and also pivotally connected to the link 17. The arm 18 is received and operated by a steering unit 22, the operation of the latter being governed by a hydraulic control unit 21. A pair of conduits 23 provide the necessary connections for the hydraulic control unit 21.

The foregoing description relates to a more or less typical power assisted steering assembly. The present invention, however, is more particularly directed to a socket connection for use in the tie rod assembly, such as may be exemplified by the socket assemblies 24 between the link 17 and the tie rods 16 or the socket assemblies 25 between the ends of the link 17 and the idler and pitman arms.

The type of joint assembly employed at the joints 24 and 25 is best illustrated in Figures 2 through 5 of the drawings. As will be seen from these figures, the joint 24 may include a housing 27 with an integrally formed laterally extending stem or shank 28 arranged to be connected to a tie rod or other linkage member. The housing 27 has a central cavity 29 which is closed at one end by means of a closure plate 30 which is held in fixed position with respect to the housing by spinning over a portion 27a of the housing.

Formed in the housing 27 is an inner segmental spherical bearing surface 27b which terminates at its upper end in an opening 31 which can be circular or oval shaped to accommodate wide angle tilting of the joint stud. The bearing surface 27b tiltably mates with the outer surface of a bearing ring 32 of generally hollow segmental spherical configuration. The bearing ring 32 at its inner surfaces embraces a frusto conical head 33a of a stud 33 in bearing relation.

The base of the stud, generally indicated at 33b has a substantially planar surface with a central depending segmental spherical ball portion 33c. A spring loaded seat or retainer 34 having a centrally recessed portion 34a for receiving the ball portion 33c is urged into engagement with the ball portion 33c by the action of a coiled spring 35 which has its smaller diameter end bottomed against the closure plate 30 and its upper wider end engaging the spring seat 34.

In order to provide a joint assembly which will resist tilting movement of the stud 33 about the ball portion 33c as a pivot, and to right the stud when such tilting occurs, the assembly is provided with an annular spring member 36 composed of spring steel or similar resilient material. The structure of the annular spring 36 is best illustrated in Figure 5 of the drawings from which it will be apparent that the inner diameter 36a of the spring is greater than the diameter of the ball portion 33c on the stud 33. The annular spring member 36 is generally frusto conical in configuration and includes an inwardly turned inner end 36b, an intermediate raised portion 36c which normally abuts the planar surface 33b on the stud 33, and an outer edge 36d which is received in fixed relation in the housing 27. For this purpose, the housing 27 may be internally grooved with a suitably shaped notch to receive and hold the free outer end 36d of the spring member.

In normal position of the joint, as illustrated in Figure 2, the portion 36c presses lightly against the planar surface 33b and the bias of the spring 35 is sufficient to keep the ball portion 33c continuously seated within its socket provided by the recessed portion 34a of the spring seat 34. When, however, the joint is subjected to stresses which would attempt to cause a misalignment between the stud 33 and its socket, as illustrated in Figure 3 of the drawings, the planar surface 33b bears down upon the annular spring member 36 which resists this vertical displacement. As illustrated in Figure 5, the annular spring member 36 may be provided with a plurality of spaced notches 36e which divide the inner surface of the annular spring member 36 into a plurality of resilient fingers 36f to increase the flexibility of the spring member.

The limit of vertical tilting movement of the stud 33 is determined by the engagement of the one or more of the fingers 36f with the spring seat 34, as illustrated in Figure 4 of the drawings. When this condition is reached, further tipping of the ball stud 33 is prevented. However, when the tilting load is dissipated, the natural resiliency of the fingers 36f causes the stud to be righted and thereafter positioned with its vertical axis in line with the axis of the recessed portion 34a of the spring seat 34.

The assembly described not only has the ability to resist tilting movement of the ball stud, and to replace the stud in correct axial alignment with its socket after the turning pressure is removed, but also serves the useful function of decreasing the possibility of unseating the ball from its socket.

From the foregoing, it will be apparent that the joint structure of the present invention provides a distinct improvement in ball and socket connection of the type employed in steering linkages.

It should be evident that various modifications can be made to the described embodiment without departing from the scope of the present invention.

I claim as my invention:

1. A joint structure comprising a housing having a central cavity and an inner segmental spherical bearing surface, a closure plate closing one end of said cavity, a bearing ring having an outer bearing surface mating with the inner bearing surface of said housing, a stud having a bearing face arranged to be received along the inner surface of said bearing ring, said stud having a planar lower surface and a segmental spherical ball portion extending downwardly from said planar lower surface, a recessed spring seat receiving said ball portion, a spring having one end bottomed on said closure plate and urging said spring seat into seated relation with said ball portion, and an annular spring member having its outer peripheral edge bottomed by the walls of said housing in spaced relation to said closure plate and having a raised annular surface abutting said planar lower surface to urge said stud into an upright position.

2. A joint structure comprising a housing having a central cavity and an inner segmental spherical bearing surface, a bearing ring having an outer bearing surface mating with the inner bearing surface of said housing, a stud having a bearing face arranged to be received along the inner surface of said bearing ring, said stud including a segmental ball portion and a planar surface extending radially outwardly from the edge of said ball portion, a recessed spring seat receiving said ball portion, a spring urging said spring seat into seated relation with said ball portion, and an annular spring member comprising a notched frusto conical member composed of resilient material disposed between said spring seat and said stud, said annular spring member having its lower edge supported by the walls of said housing in spaced relation to said spring seat and having a raised contacting surface engaging said planar surface to urge said stud into an upright position.

References Cited in the file of this patent

UNITED STATES PATENTS

| 2,147,815 | Hufferd et al. | Feb. 21, 1931 |

FOREIGN PATENTS

| 299,271 | Great Britain | Oct. 25, 1928 |
| 1,051,638 | France | Sept. 16, 1953 |
| 1,052,102 | France | Sept. 23, 1953 |